Figure 1:
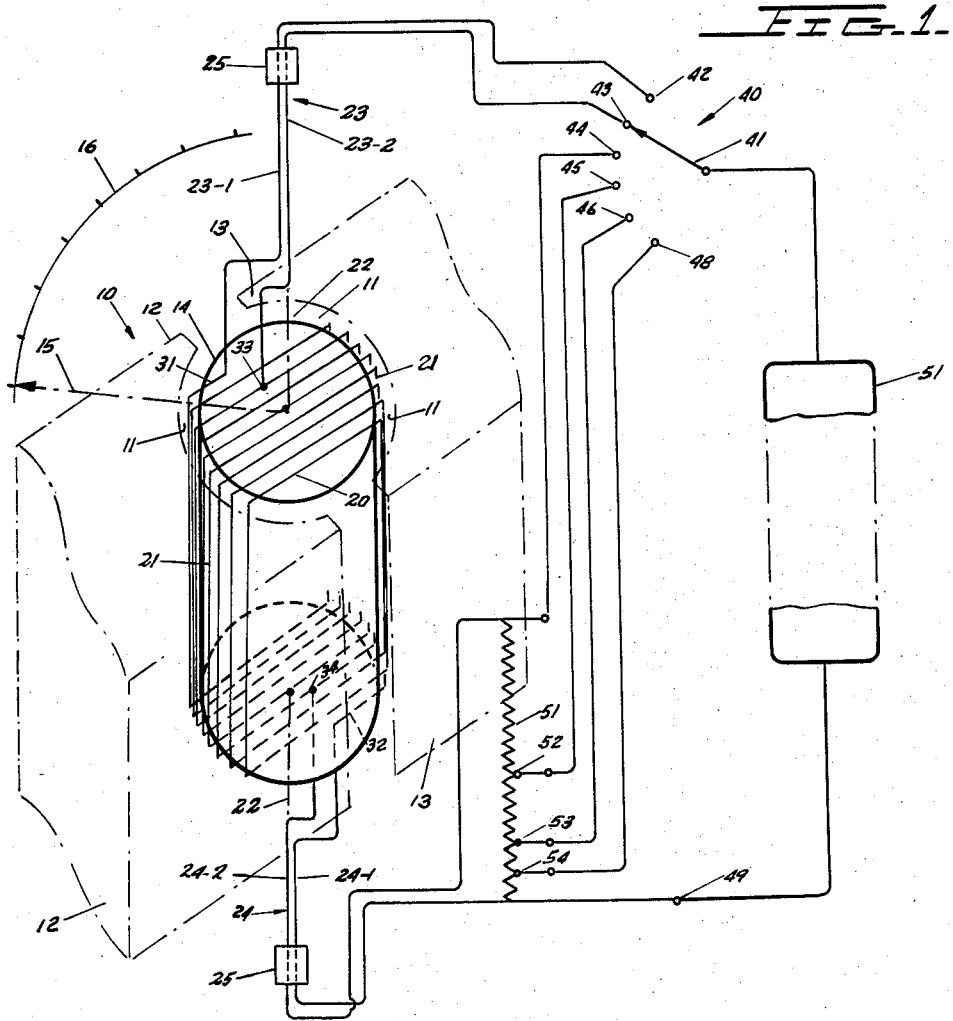

April 14, 1959     E. H. GREIBACH     2,882,496

ELECTRICAL MEASURING DEVICES

Filed Feb. 25, 1954

INVENTOR.
E. H. GREIBACH
BY
Greene, Pineles & Dunn
ATTORNEYS

United States Patent Office 2,882,496
Patented Apr. 14, 1959

2,882,496

ELECTRICAL MEASURING DEVICES

Emil H. Greibach, New Rochelle, N.Y.

Application February 25, 1954, Serial No. 412,461

6 Claims. (Cl. 324—125)

This invention relates to electric measuring devices and more particularly, to electrical measuring devices using a direct current meter movement of the D'Arsonval type in which a movably mounted coil is deflected or rotated in an air gap of a magnetic field structure for giving an accurate indication of the current flowing through the meter coil.

Most generally used D.C. meters have a damping resistance connected in shunt across the movable meter coil to provide critical damping which brings the coil to its proper current indicating position without annoying oscillations. In most cases, the damping resistance is a multiple of the coil resistance of such D.C. meters. As an example, a generally used D.C. meter operating with a sensitivity of 5 microamperes full scale has a damping resistance which may be 100 times greater than the coil resistance.

A great many such D. C. meters are designed for operation with different sensitivities, such meters being known as multimeters, by which name they will be designated herein.

In order to operate with the different sensitivity settings, the damping resistance of such prior art multimeters has a plurality of sensitivity taps connected to different switch contacts of a sensitivity switch by which the circuit which is to be measured or the measured circuit is connected to the meter coil by way of one or the other of the resistance taps to provide the desired measuring sensitivity setting.

When such prior art multimeter having a multi-tap damping resistance (also known as universal shunt or Ayerton shunt) is used to measure the current of a measured circuit, the resistance represented by circuit parts of the meter absorbs a relatively large amount of energy corresponding to the internal voltage drop across the resistance of the circuit parts of the meter.

It has been long realized that the relatively large internal resistance voltage drop developed in known direct current multimeters is objectionable in many applications. As an example, when measuring the current from a photocell, transistor or like circuit element which does not have the ability to provide energy for the required meter resistance voltage drop, the measurement with known multimeters does not provide a correct indication of the current carrying ability of such circuit element. In other words, when such prior D.C. meter is connected to measure the current of such circuit element, the resistance represented by the meter absorbs a relatively large amount of energy as a voltage drop across its circuit elements and the meter is not able to determine the actual current that flows from such circuit element when a circuit of relatively low resistance is connected to such circuit element.

Among the objects of the invention is a direct-current multimeter with a critical damping resistance connected to the meter coil and which permits measurement of D.C. current with a plurality of sensitivity settings and which at the same time overcomes the difficulties encountered with prior art direct current multimeters, the different sensitivity settings of which are provided by tap connections of its damping resistance.

In accorance with the invention, the difficulties encountered with prior art direct current multimeters are overcome by providing a D.C. meter having a movable meter coil with a plurality of coil taps to different sections of the meter coil and combining therewith a damping resistance which is connected to only a part of the coil turns of the meter coil.

The principles of the invention may be applied to any of the known direct current meters of the D'Arsonval type, such as those which operate with a meter coil which rotates on pivots or meters of the type disclosed in U.S. Patent No. 2,562,183 wherein the rotary meter coil is carried by a filary suspension structure.

Figure 2:
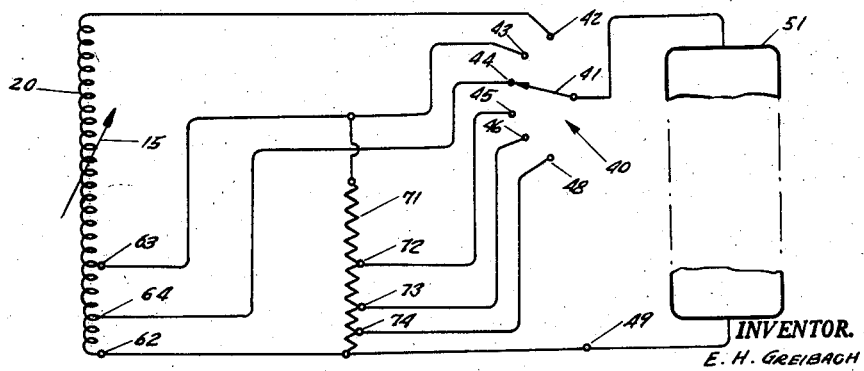

The foregoing and other objects of the invention will be best understood from the following description of exemplifications thereof, reference being had to the accompanying drawings, wherein:

Fig. 1 is a diagrammatic view of one form of a measuring device exemplifying the invention; and Fig. 2 is a diagrammatic view of a modified form of invention.

Fig. 1 shows diagrammatically the principal elements of one form of a direct-current D'Arsonval meter of the type described in U.S. Patent No. 2,562,183, and in connection with which one exemplification of the invention will be described. It comprises a magnetic core structure 10 (shown in dash-dot lines) for producing a uniform unidirectional field in two arcuate magnetic air gaps 11 within which two opposite operative sides 21 of a meter coil 20 are arranged to deflect or rotate around a central axis indicated by a dash-dot line 22. The magnetic field structure is of a conventional type and has a field inducing permanent magnet with two pole pieces 12, 13 which form with an intermediate central cylindrical core element 14 a substantially closed magnetic circuit separated by the two arcuate air gaps 11 in which the two coil sides 21 of the coil 20 are arranged to swing or rotate. The coil 20 carries a meter indicator or pointer 15, which may be either a light pointer or a mechanical pointer that swings with the coil 20 and indicates on a scale 16 the current flowing through the coil 20 corresponding to the deflection produced by the coil current.

The meter coil 20 may be mounted for deflecting or swinging movement on coil pivots as in conventional direct-current meters and the connections to the coil 20 may be provided by conventional spiral restoring springs which return the coil 20 to the zero position. The meter of Fig. 1 is indicated as having the coil 20 carried for swinging rotary movement around the coil axis 21 by two opposite bifilary suspension members 23, 24 extending from the opposite transverse sides of the meter coil 20 to two opposite supporting anchor elements 25 in which the two filary elements of each bifilary suspension members 23, 24 are insulatingly mounted as disclosed in U.S. Patent No. 2,562,183. The restoring forces of the bifilary suspension members 23, 24 control the movement of the coil and its pointer 15 over the scale 16 and return it to the zero position on the scale.

According to the invention, a direct-current multimeter or measuring instrument of this type has its movable meter coil or measuring coil provided with coil taps subdividing the coil turns of the meter coil and the meter coil is combined with a damping resistance which is connected only to a part of the total coil turns, the damping resistance having additional resistor taps which together with the coil taps provide a series of meter connections for operating the meter with the desired different sensitivities while avoiding the difficulties due to excessive voltage resistance drop in the circuit elements of the meter.

The meter of Fig. 1 is shown provided with a sensitivity switch 40 having a movable switch arm 41 arranged to be moved in selective contact engagement with any one of switch contacts 42, 43, 44, 45, 48 corresponding to the different sensitivities with which the meter is to be operated. End turn 31 of the meter coil 20 is connected to a first switch contact 42 of the sensitivity switch 40. The opposite coil end turn 32 of meter coil 20 is connected to external meter terminal 49 which together with the movable switch arm 41 of selector switch 40 constitute the pair of external meter terminals to which external measured circuits are connected for performing measurements of currents flowing therethrough. Fig. 1 shows such external measured circuit 51 connected to the pair of external meter terminals 41, 49.

According to the invention, the meter of Fig. 1 is provided with a critical damping resistance 51 which is connected—not across the ends of the entire meter coil—but only to a part of the coil turns of meter coil 20, and the damping resistance is provided with intermediate resistance tap connections arranged so that the meter will measure current with an additional sensitivity setting lower than the highest.

In the exemplification of the invention indicated in Fig. 1, the first switch contact 42 of sensitivity switch 40 is shown connected to coil end turn 31 through one of the insulated metallic suspension filaments 23–1 of bifilary suspension member 23. The common external meter terminal 49 is connected to the opposite coil end turn 32 of meter coil 20 through one metallic suspension filament 24–1 of the opposite bifilary suspension member 24 of meter coil 20. The transverse upperside of meter coil 20 (Fig. 1) is provided with a coil tap 33 which is connected through the other metallic suspension filament 23–2 of bifilary suspension member 23 to switch contact 43 of sensitivity switch 40, this switch contact providing for the meter sensitivity next lower to the highest sensitivity provided when sensitivity switch arm 41 engages highest sensitivity switch contact 42. The transverse downward side of meter coil 20 is provided with a coil tap 34 which is connected through insulated metallic filament 24–2 of the bifilary suspension member 24 to switch contact 44 of sensitivity switch 40.

As explained above, the measuring instrument of Fig. 1 is provided with a damping resistance 51 which according to the invention is not connected across the entire meter coil 20 but only to a fraction of the coil turns of the meter coil 20. In the form shown, the damping resistance 51 is connected only to the fraction of the coil turns of meter coil 20 which extend between the coil tap 34 and coil end turn 32 which are connected respectively to the sensitivity switch contact 44 and the common external meter terminal 49. The damping resistance 51 is shown provided with a plurality of resistance taps 52, 53, 54 which are connected to additional switch contacts 45, 46, 48 of the sensitivity switch 40. The connections of the resistance taps 52, 53, 54, to the sensitivity switch contacts 45, 46, 48 provide for operation of the meter with a further succession of sensitivity settings lower than the series of sensitivity settings provided by switch contacts 42, 43, 44 any one of which may be established by movement of switch member 41 to any one of these switch contacts.

By connecting the damping resistance 51 to only a fraction of the coil turns of the meter coil, the required critical damping of the coil movement is obtained with only a fraction of electrical resistance that would be required for obtaining the critical damping with a resistance connected across all turns of the meter coil as in the prior art. The required amount of critical damping resistance decreases in accordance with the square of the ratio of the smaller number of coil turns to which the damping resistance is connected, to the total number of turns of the meter coil 20. As an example, if the damping resistance is connected in shunt to ⅓ of the coil turns of the total coil, the value of the critical resistance would be only ⅑ of that required by a damping resistance which is connected in shunt to all coil turns or to the entire coil 20.

Such connection of the critical damping resistance to only a fraction of the total coil turns of the meter coil results in a relatively very large and very desirable reduction of the electrical resistance which the meter represents to the measured circuit.

The advantages of the multimeter arrangement of the invention will be apparent by comparison of the operating characteristics of a typical prior art multimeter having a damping resistance connected across the entire meter coil with the same meter when modified in accordance with the invention by providing it with a critical damping resistance connected to only a fraction of the coil turns of the same meter coil. Such comparison is given in the table below for a prior direct current multimeter having five sensitivities of 20, 100, 200, 500 and 1000 microamperes (μa.) with a similar meter modified in accordance with the invention by a damping resistance connected only to a part of the coil turns of the meter coil.

PRIOR-ART METER

| Sensitivity setting, μa. | Millivolt drop across meter resistance |
| --- | --- |
| 20 | 63 |
| 100 | 516 |
| 200 | 594 |
| 500 | 607 |
| 1,000 | 618 |

SAME METER MODIFIED ACCORDING TO THE INVENTION

| | |
| --- | --- |
| 20 | 5 |
| 100 | 5 |
| 200 | 5 |
| 500 | 45 |
| 1,000 | 50 |

In a similar way, multimeters of the invention intended for other sensitivity settings and having the critical damping resistance connected to only a fraction of the total coil turns of the moving meter coil will operate with a small fraction of the meter resistance with which prior-art multimeters with the same sensitivity settings had to operate.

By way of example, multimeters of the invention having the damping resistance connected to only ¹⁄₁₀ of the coil turns of the moving meter coil 20 may be designed to operate with sensitivity settings of 1, 3, 10, 30, 100, 300 and 1000 microamperes full scale, the meter representing in all of its settings a very low meter resistance and a correspondingly very low voltage drop, making it ideal for performing measurements on transistors, photocells and like circuit elements. The sensitivity switch 40 of such multimeter provides at the first three switch contacts, 42, 43, 44 the sensitivity settings of 1, 3 and 10 microamperes full scale deflection. The shunting resistance 51 is connected to about ⅓ of the coil turns. The additional sensitivity settings are provided by connections of additional successive switch contacts 44, 45, etc., to properly selected taps of the critical damping resistance 51.

Some direct-current multimeters have to be designed with relatively large ratios of sensitivity ranges such as 1, 10, 100, 1000, 10,000 microamperes full scale. In a meter of the invention designed with such sensitivity ranges, it may be of advantage to connect the critical damping resistance to a coil section of the meter coil having more coil turns than the coil section of the smallest number of turns at a sacrifice of the increase in the required critical damping resistance.

Fig. 2 shows such multimeter of the invention. It comprises a meter movement having a moving coil 20 as described in connection with Fig. 1, carrying an indicator or pointer 15 for indicating on an associated scale the current flowing through the coil 20 or portions thereof as in Fig. 1. The meter is provided with a sensitivity switch 40 having a movable switch member 41 and a series of switch contacts 42 to 48, for connecting a measured circuit 51 to the meter in any selected one of a series of sensitivity settings from the highest sensitivity setting at switch contact 42 to successively lower sensitivity settings as in Fig. 1.

The meter coil 20 of Fig. 2 is shown provided with two intermediate coil taps 63, 64 which are connected to sensitivity switch contacts 43, 44 which provide two next lower sensitivity settings than that of switch contact 42. Assuming that the coil section between coil end 62 and the next coil tap 64 contains only about 1/100 of the coil turns of the meter coil 20, a critical damping resistance connected to such small number of coil turns would have to be of such small magnitude as to make it inconvenient to provide it with the additional resistance taps for additional lower sensitivity settings. In such case it is more practical to connect the critical resistance to a coil section which has a larger number of coil turns than the lowest one, but still has only a fraction, such as ½ of the total number of coil turns of the meter coil. Thus as indicated in Fig. 2, the proper critical resistance is connected across the next larger number of coil turns of the two coil sections embraced between coil tap 63 and coil end 62. This makes it possible to operate the meter with a critical damping resistance of higher value which is more readily provided with the intermediate resistance taps 72, 73, 74 which are connected to the other sensitivity switch contacts 44, 45, etc. at which the multimeter will operate with the desired smaller sensitivities than provided at switch contacts 41, 42, 43.

In general, good results are obtained and very material advantages are secured over prior-art direct current multimeters by connecting the damping resistance to a section of the movable meter coil containing about ½ or less of the total number of coil turns of the meter coil. In practical meters of the invention it is in most cases convenient to connect the damping resistance to a coil section having at least 1/20 of the total number of coil turns of the movable meter coil.

It should be noted that in multimeters of the invention, the damping resistance, which is connected to only a part of the coil turns of the movable meter coil, has an effect on the sensitivity ratios with which the meter will operate when different parts or sections of the meter coil are connected to the measured circuit in the different settings of the sensitivity switch 40. Accordingly, corrections must be introduced for the numbers of the coil turns for each coil section of such multimeter and this becomes very difficult if a coil section having only a small number of the total coil turns of the meter coil has connected thereto the damping resistance.

The features and principles underlying the invention described above in connection with specific exemplifications, will suggest to those skilled in the art many other modifications thereof. It is accordingly desired that the appended claims be construed broadly and that they shall not be limited to the specific details shown and described in connection with exemplifications thereof.

I claim:

1. In a direct-current measuring device having a magnetic core structure for inducing a unidirectional magnetic field in an air-gap region thereof, a coil with two coil end terminals and a relatively large number of coil turns and having coil sides movably positioned in said gap region for producing a coil deflection corresponding to the direct current through said coil, said coil having at least one intermediate coil tap subdividing said coil into at least two coil parts extending between said two coil end terminals with a substantial number of coil turns in each coil part, a damping resistance connected to only one of said two coil parts between one of the coil end terminals and said intermediate coil tap, said damping resistance being proportioned to cause said coil to move to the desired current-indicating position under absence of coil oscillations when direct current is passed through said coil from an external circuit, said one coil part containing at most one-half of the coil turns of said coil, whereby said device operates at a sensitivity setting of 1000 microamperes full scale with a voltage drop across the measuring device of at most 300 millivolts.

2. In a direct-current measuring device having a magnetic core structure for inducing a unidirectional magnetic field in an air-gap region thereof, a coil with two coil end terminals and a relatively large number of coil turns and having coil sides movably positioned in said gap region for producing a coil deflection corresponding to the direct current through said coil, said coil having at least one intermediate coil tap subdividing said coil into at least two coil parts extending between said two coil end terminals with a substantial number of coil turns in each coil part, a damping resistance connected to only one of said two coil parts between one of said coil end terminals and said intermediate coil tap, said damping resistance being proportioned to cause said coil to move to the desired current-indicating position under absence of coil oscillations when direct current is passed through said coil from an external circuit, said one coil part containing at most one-half and at least 1/20 of the total coil turns of said coil, whereby said device operates at a sensitivity setting of 1000 microamperes full scale with a voltage drop across the measuring device of at most 300 millivolts, said resistance having a plurality of serially connected resistance elements with at least one resistance tap between the serially connected resistance elements, and switch means selectively movable between a high sensitivity setting in which said switch means connects the external circuit across the two coil end terminals and at least one lower sensitivity setting in which said switch means connects said circuit between said one coil end terminal and one of the resistance taps for selectively performing current measurements with different sensitivity settings corresponding to the selected setting of said switch means.

3. In a direct-current measuring device having a magnetic core structure for inducing a unidirectional magnetic field in an air-gap region thereof, a coil with two coil end terminals and a relatively large number of coil turns and having coil sides movably positioned in said gap region for producing a coil deflection corresponding to the direct current through said coil, said coil having at least one intermediate coil tap subdividing said coil into at least two coil parts extending between said two coil end terminals with a substantial number of coil turns in each coil part, a damping resistance connected to only one of said two coil parts between one of said coil end terminals and said intermediate coil tap, said damping resistance being proportioned to cause said coil to move to the desired current-indicating position under absence of coil oscillations when direct current is passed through said coil from an external circuit, said one coil part containing at most one-half and at least 1/20 of the total coil turns of said coil, whereby said device operates at a sensitivity setting of 1000 microamperes full scale with a voltage drop across the measuring device of at most 300 millivolts, said resistance having a plurality of serially connected resistance elements with at least one resistance tap between the serially connected resistance elements, and switch means selectively movable between a high sensitivity setting in which said switch means connects the external circuit across the two coil end terminals and at least one lower sensitivity setting in which said switch means connects said circuit between said one coil end terminal and one of said resistance taps or to one of said coil taps of said coil for selectivity performing current measurements with different sensitivity settings corresponding to the selected setting of said switch means.

4. In a direct-current measuring device as claimed in claim 1, two sets of two adjacent metallic filaments extending, respectively, from the two other opposite transverse coil sides and constituting the sole rotatable support carrying said coil in floating operative position and opposing deflection of said coil from a preset position, each filament being electrically insulated from the adjacent filament, two of said filaments being connected with their inner filament ends to the two coil end terminals, respectively, and with their outer filament ends to external circuit portions of said measuring device, a third of said filaments being connected with its inner filament end to said intermediate coil tap, said damping resistance being connected between the outer filament end of said third filament and the outer filament end of one of the two filaments extending from said two coil end terminals.

5. In a direct-current measuring device as claimed in claim 2, said coil having a further coil tap subdividing the other of said coil parts into two coil sections, two sets of two adjacent metallic filaments extending, respectively, from the two other opposite transverse coil sides and constituting the sole rotatable support carrying said coil in floating operative position and opposing deflection of said coil from a preset position, each filament being electrically insulated from the adjacent filament, two of said filaments being connected with their inner filament ends to the two coil end terminals, respectively, and with their outer filament ends to external circuit portions of said measuring device, a third of said filaments being connected with its inner filament end to said intermediate coil tap, said damping resistance being connected between the outer filament end of said third filament and the outer filament end of one of the two filaments extending from said two coil end terminals, the fourth of said filaments being connected with its inner filament end to said further coil tap and with its outer filament end to a switch contact of said sensitivity switch through which it is connected to an external circuit in an intermediate sensitivity setting of said switch.

6. In a direct-current measuring device as claimed in claim 3, said coil having a further coil tap subdividing the other of said coil parts into two coil sections, two sets of two adjacent metallic filaments extending, respectively, from the two other opposite transverse coil sides and constituting the sole rotatable support carrying said coil in floating operative position and opposing deflection of said coil from a preset position, each filament being electrically insulated from the adjacent filament, two of said filaments being connected with their inner filament ends to the two coil end terminals, respectively, and with their outer filament ends to external circuit portions of said measuring device, a third of said filaments being connected with its inner filament end to said intermediate coil tap, said damping resistance being connected between the outer filament end of said third filament and the outer filament end of one of the two filaments extending from said two coil end terminals, the fourth of said filaments being connected with its inner filament end to said further coil tap and with its outer filament end to a switch contact of said sensitivity switch through which it is connected to an external circuit in an intermediate sensitivity setting of said switch.

References Cited in the file of this patent

UNITED STATES PATENTS

| | | |
|---|---|---|
| 1,288,019 | Johnson | Dec. 17, 1918 |
| 1,901,343 | Eastham | Mar. 14, 1933 |
| 1,901,344 | Horton | Mar. 14, 1933 |
| 2,266,624 | Hall | Dec. 16, 1941 |
| 2,351,353 | McCarty | June 13, 1944 |
| 2,443,073 | Knudsen | June 8, 1948 |
| 2,478,966 | Gilbert | Aug. 16, 1949 |
| 2,588,394 | Lamb | Mar. 11, 1952 |
| 2,602,096 | Gilbert | July 1, 1952 |
| 2,651,756 | Morrow | Sept. 8, 1953 |
| 2,677,105 | Heiland | Apr. 27, 1954 |
| 2,678,424 | Heiland | May 11, 1954 |